United States Patent
Marsh

(10) Patent No.: US 10,474,995 B2
(45) Date of Patent: Nov. 12, 2019

(54) METHOD AND COMPUTER-READABLE MEDIA FOR MANAGING GOVERNING DOCUMENTS IN COMPLEX BUSINESS TRANSACTIONS

(71) Applicant: Robert Elliott Marsh, Kansas City, MO (US)

(72) Inventor: Robert Elliott Marsh, Kansas City, MO (US)

(*) Notice: Subject to any disclaimer, the term of this patent is extended or adjusted under 35 U.S.C. 154(b) by 235 days.

(21) Appl. No.: 15/372,621

(22) Filed: Dec. 8, 2016

(65) Prior Publication Data

US 2017/0178074 A1 Jun. 22, 2017

Related U.S. Application Data

(60) Provisional application No. 62/269,803, filed on Dec. 18, 2015.

(51) Int. Cl.
 *G06Q 10/10* (2012.01)
 *G06F 21/62* (2013.01)
 *G06F 21/31* (2013.01)

(52) U.S. Cl.
 CPC ............ *G06Q 10/10* (2013.01); *G06F 21/31* (2013.01); *G06F 21/6218* (2013.01)

(58) Field of Classification Search
 None
 See application file for complete search history.

(56) References Cited

U.S. PATENT DOCUMENTS

| | | | | |
|---|---|---|---|---|
| 8,397,161 | B1* | 3/2013 | Shah | G06F 17/218 715/234 |
| 8,924,999 | B1* | 12/2014 | Santangelo | H04N 21/25875 725/10 |
| 9,176,938 | B1* | 11/2015 | Kerschen | G06F 17/2235 |
| 2006/0059253 | A1* | 3/2006 | Goodman | G06Q 10/06 709/223 |
| 2007/0270980 | A1* | 11/2007 | Lipner | G05B 19/41875 700/19 |
| 2008/0104408 | A1* | 5/2008 | Mayer | H04N 1/32112 713/178 |
| 2008/0313186 | A1* | 12/2008 | Marsh | G06F 17/30011 |
| 2011/0010304 | A1* | 1/2011 | Chan Wong | G06Q 10/10 705/317 |
| 2014/0040182 | A1* | 2/2014 | Gilder | G06F 17/30578 707/602 |
| 2016/0134425 | A1* | 5/2016 | Peterson | G06F 21/6218 713/176 |

* cited by examiner

Primary Examiner — Toan H Vu

(57) ABSTRACT

A method, and computer-readable media for performing the method, for managing governing documents in business transactions. Electronic transaction documents are received from authenticated users and stored in an on-line transaction document database. Governing document rules are defined with transaction participants categorized in user categories. Governing documents corresponding to those user categories are stored and provided to the transaction participants for agreement according to the governing document rules as a condition to access to the on-line transaction document database.

6 Claims, 4 Drawing Sheets

METHOD AND COMPUTER-READABLE MEDIA FOR MANAGING GOVERNING DOCUMENTS IN COMPLEX BUSINESS TRANSACTIONS

BACKGROUND OF THE INVENTION

On-line document collaboration systems are used to facilitate the exchange of business transaction documents via a secure Internet website. These systems are particularly useful in situations in which multiple versions of a document are exchanged among multiple users who store and retrieve documents to and from a database. Versions of different documents may be presented in an organized manner allowing retrieval of both current and prior versions of each of the documents involved. Examples of on-line document collaboration systems are described in U.S. Pub No. 2002/0107768, U.S. Pub No. 2008/0313186 and U.S. Pat. Nos. 8,856,175 and 9,454,527, incorporated in this application by reference. On-line document collaboration systems are also useful for the posting of various documents in a database for review or consideration by other parties having access to the system, serving as electronic due diligence data rooms in business acquisition transactions and as a repository for drafts of transaction documents.

In these transactions many individual participants are involved who have different relationships with each other. All of these participants will have access to the on-line collaboration system, but in different roles and often on behalf of different organizations. Agreements may exist (or be developed) among various parties to govern the obligations of that party (and their employees and agents) with regard to information and documents accessed and exchanged using the on-line collaboration system or otherwise relating to the governance of the transaction process. It is critical that the proper governing document be agreed upon by each of the various transaction participants.

This background will provide one example of how prior art systems fail to properly address the complexities of multiparty situations with multiple governing documents. For example, documents are exchanged or presented for review in an environment involving multiple parties on different sides of a transaction. For example, document drafts may be exchanged between a buyer and a seller of a business (and their attorneys and advisers). In another example, due diligence documents relating to a seller's business may be reviewed by the prospective buyer prior to and during the negotiation of purchase transaction documents. Many of these documents are highly confidential.

It is common for a provider of a secure Internet site to require users to accept or agree to "terms of use" before gaining access to that site. Those terms of use may include, for example, confidentiality provisions. These standardized agreements are typically between the provider of the site and the user. These standardized agreements may not accurately recognize, however, the unique characteristics of different transaction participants (and website users) or the proper identity of the parties to the various confidentiality or other governance obligations that may apply. In the case of a business transaction involving a "buyer" and a "seller" almost all of the due diligence information is the confidential property of the seller. While it might be appropriate to remind seller employees having access to the site of their obligations as employees of the seller, creating a new, binding confidentiality obligation on the part of those employees is not necessary or, to the extent it creates an additional obligation with a different party—possibly inconsistent with an existing employee agreements, desirable.

A buyer, on the other hand, should be subject to strict confidentiality obligations enforceable by the seller. In most cases those obligations would be carefully defined in a confidentiality or nondisclosure agreement negotiated between the buyer and seller as one of the first steps in pursuing the potential transaction. Buyer employees should be subject to this negotiated confidentiality agreement, not a different agreement presented by a website provider.

Transaction advisers are another set of transaction participants. Different advisers should have different confidentiality obligations based on their role, existing agreements, and, in the case of legal advisors, governing ethics requirements.

One significant advantage of an on-line transaction collaboration system is that it creates a centralized database to track document access and to provide controlled access to transaction participants. But in this context a "one size fits all" approach using a "click-to-accept" single standard confidentiality provision, while simple and seemingly efficient, is not fully satisfactory. Furthermore, this prior art "click-to-accept" functionality is often structured to create contractual obligations between a user and another party—often the website provider or the party who contracted with the website provider.

This confidentiality agreement scenario is one example of a broader situation where differing agreements (referred to in this description as governing documents) apply to different pairs or groups of parties within a larger overall transaction. This invention addresses all of these situations.

SUMMARY OF THE INVENTION

The present invention addresses governing document management in business transactions conducted using an on-line document collaboration system. In a situation where different agreements (governing documents) apply to different sets of transaction parties, a robust system for managing these agreements is needed. Multiple governing document rules are defined, transaction participants are categorized in user categories for each transaction, and governing documents corresponding to those user categories are stored and provided to the transaction participants for execution as a condition to access to the transaction document database. A specific individual user may be presented with, and required to agree to, one, two or even more governing documents prior to access to the on-line document collaboration system. Or, for some users, no governing document may apply. The governing document presentation may occur at the time of each login, or more preferably, only the first time the user logs in and after that only if any of the governing document terms are changed or new governing documents become applicable. The present invention also creates and retains verifiable records of users' agreements to the applicable governing documents.

BRIEF DESCRIPTION OF THE DRAWINGS

This invention is described in detail below with reference to the attached drawing figures.

DETAILED DESCRIPTION OF THE INVENTION

This invention is comprised of the method described in more detail below. The invention also comprises one or more computer-readable media having computer-executable instructions embodied thereon and associated processors and memory for performing this method. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
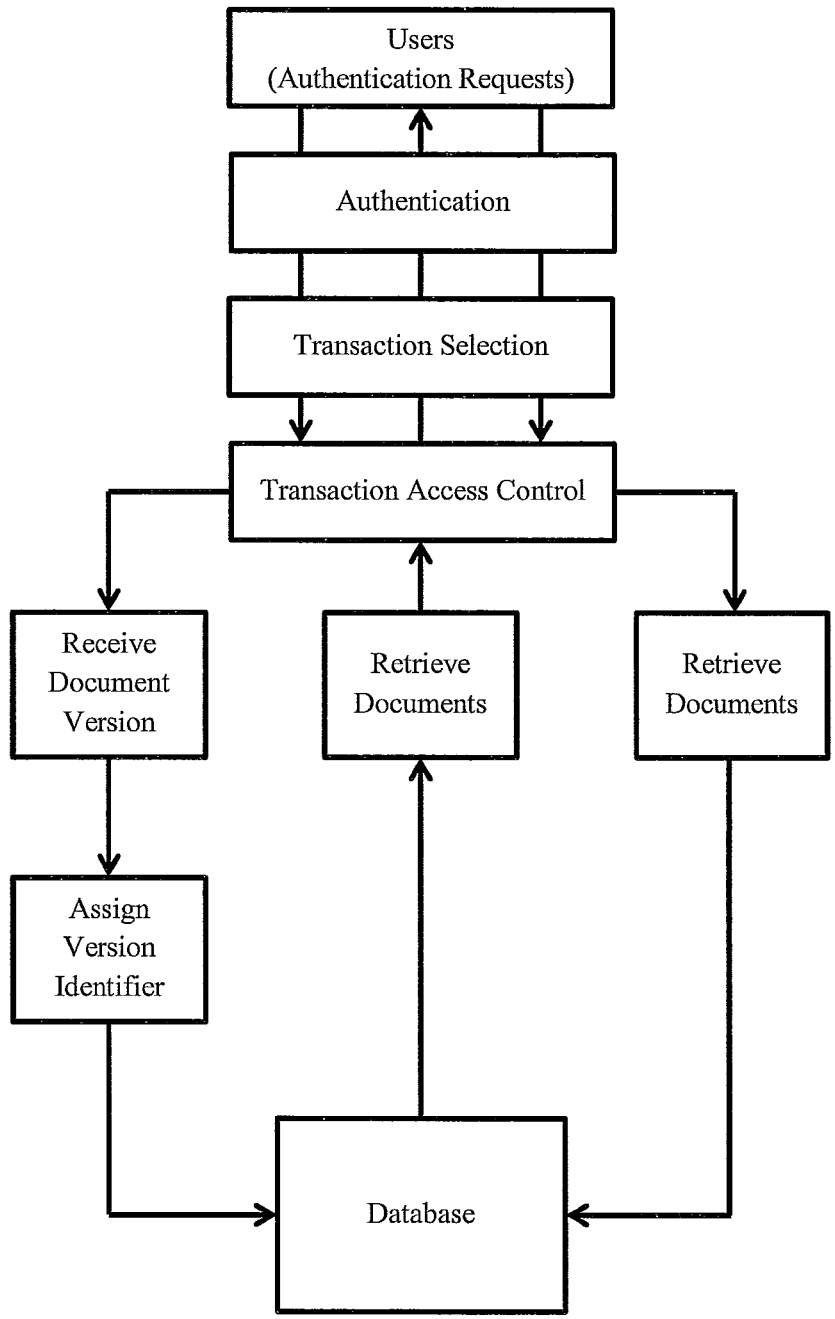
FIG. 1 is a block diagram showing the general configuration of an on-line document collaboration exchange system including the present invention.

FIG. 1 shows the general configuration of an on-line document collaboration system. Users (after they have been authenticated) may submit and retrieve documents to and from a shared database. Transaction documents are organized with identified sets of users authorized to access documents within a transaction. To facilitate the negotiation process, some document versions exchanged might be in a format that can be easily modified, such as a Microsoft Word format. Other documents (such as those in an electronic "data room") may be posted for review but not modification and may be in a nonalterable format (such as Adobe PDF).

Referring to FIG. 1, in a preferred embodiment of the invention, application software is installed on a computer with an operating system software. The process begins with a user providing an authentication request. The application software authenticates users seeking access to the system (for example, via the Internet) by comparing a user provided user name and password against a list of authorized list of user names and passwords. Preferably a "firewall" is also present between authenticated users and the application server to allow passage of only certain types of data packet transmissions (such as, for example, http or https).

After user authentication, in the present invention the authorized user selects one of the transactions for which he or she has access. The present invention then applies the appropriate governing document rules, and secures the user's indication of agreement to the applicable governing document(s) via an interface, before allowing user access to the transaction documents. Preferably the user's indication of agreement is required only once for any given governing document. This transaction access control is described in more detail below.

The application software receives electronic documents submitted by authenticated users. Documents submitted as versions for subsequent modification are assigned version identifiers. The application software communicates with a database server and associated software (such as, for example, Microsoft SQL Server) for storage of these electronic documents and related version identifiers. The application software and database server software may be installed on one computer or on different computers. For purposes of this application, "database" includes the computer-readable media and associated processors necessary to index and store electronic document files on one or more computers. Electronic documents received by the application software are stored in the database, together with any corresponding document version identifiers. Authenticated users may retrieve electronic documents from the database.

Figure 2:
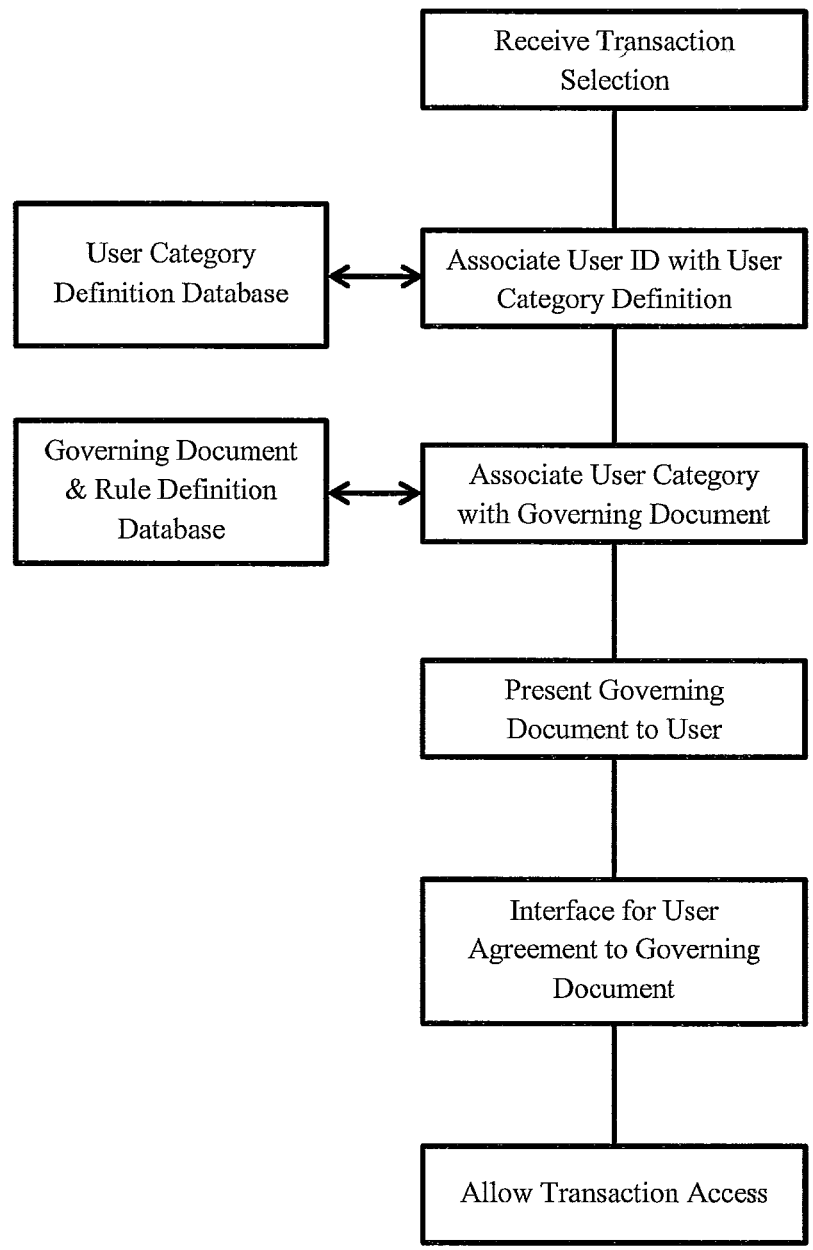
FIG. 2 is a block diagram showing the transaction access control elements of a preferred embodiment of the present invention.

FIG. 2 provides more detail on the transaction access control elements of a preferred embodiment of the present invention. As shown in FIG. 2, for each transaction one or more governing documents, for example, confidentiality obligation documents, are stored and assigned identifiers and stored in a database. Users having access to a transaction (after verification in the authentication process described above) are grouped into user categories and rules are defined that associate each user category for that transaction with applicable governing documents. User categories are stored in a User Category Definition Database and the governing documents, together with the rules associating user categories with governing documents, are stored in the Document and Rule Definition Database, both of which are shown in FIG. 2. These databases could be combined and be part of a single storage medium. The identification of user categories and the association of the appropriate documents (the governing document rule definition) would ideally be assigned by the transaction administrator who adds a particular user to the transaction at the time of the user addition. The appropriate governing document is presented to each user after the user has completed authentication and transaction selection, and acceptance of the governing document is required via a user interface (typically a box to be checked with a mouse click). Preferably, a particular user's agreement to the applicable governing document is recorded at the first authentication of that user and further agreement by that user is not required. A record would be added to the applicable database to provide verifiable evidence of that user's agreement in a manner well known in the art.

Figure 3:
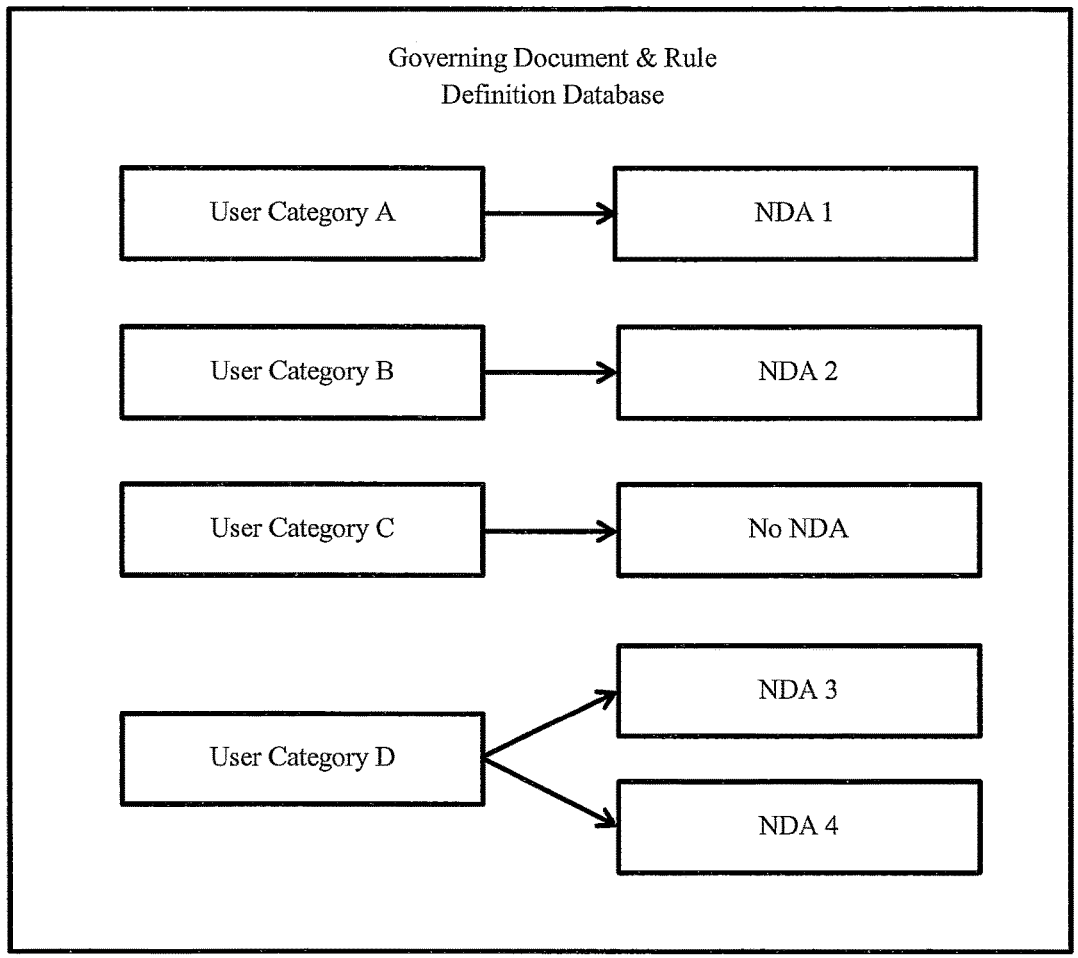
FIG. 3 is a block diagram showing the elements of the governing document and rule definition database.

The embodiment shown in FIG. 2 and FIG. 3 uses a confidentiality agreement—referred to in the figures as a Non-Disclosure Agreement (NDA)—as an example of a governing document. In this example one governing document is referred to as NDA 1—which could be a detailed confidentiality agreement negotiated by the parties to the transaction and stored in the database. In this case NDA 1 would be an agreement between the actual parties to the transaction, not an agreement with the provider of the Internet based document collaboration system. User Category A would be comprised of employees (and, if applicable, advisers) of the party bound to confidentiality under the negotiated agreement referenced above. The confidentiality obligation document represented by NDA 2 could be a reminder of confidentiality obligations and reference to an employee's existing confidentiality agreement, and would be applicable to a User Category B that would be defined to include employees of the party disclosing confidential information. User Category C might be users who need not sign any NDA, such as, for example, legal counsel for a party with existing clear confidentiality obligations only to its client. Users in User Category D might include independent contractors who would be required to agree to both an NDA with their employer (NDA 3) and an NDA with their employer's client (NDA 4). Ideally every user would be expected to agree to or acknowledge at least one governing document, even if it were only a short reminder. In complex transactions there may be additional User Categories and additional governing documents.

Referring to FIG. 1, in some transactions it may also be desirable for all governing documents that apply to users in a particular transaction be stored in the Database shown at the bottom of FIG. 1 and be available to all transaction participants—in addition to the actual transaction documents.

The present invention would present the applicable governing document to the applicable user for the particular transaction. For example, following the steps in FIG. 2 and applying the governing documents and rules defined in FIG. 3, User 1 (in User Category A) would agree to NDA A. Only after User 1 has agreed to the applicable confidentiality obligation document (either at each log in and authentication or, alternatively, at least once previously) via a user interface would User 1 be afforded access to documents in the transaction document database. In a preferred embodiment of the invention, the user's acceptance of a confidentiality obligation document, as well as the fact of the user's access to the transaction document database, would be recorded and archived. Continuing with this example of a complex transaction with 15 participants, Users 2, 3, and 4 might fall in User Category A, Users 5 through 10 might be in User Category B, Users 11, 12, and 13 might fall in User Category C and User 14 might fall in User Category D.

As noted earlier, this confidentiality agreement scenario is one example of a broader situation where differing agreements apply to different pairs or groups of parties within a larger overall transaction. This invention applies to the management of a series of governing documents relating to multiparty interaction. Another example could be a multiparty international goods purchase transaction involving a buyer, a seller, logistics providers, and agents and representatives for each of these parties, in which case purchase/sale transaction documents, rather than confidentiality obligation documents, would be exchanged. Governing documents may refer to documents governing the transaction process, or more broadly to describe the governance of an overall business transaction or relationship among the parties.

Figure 4:
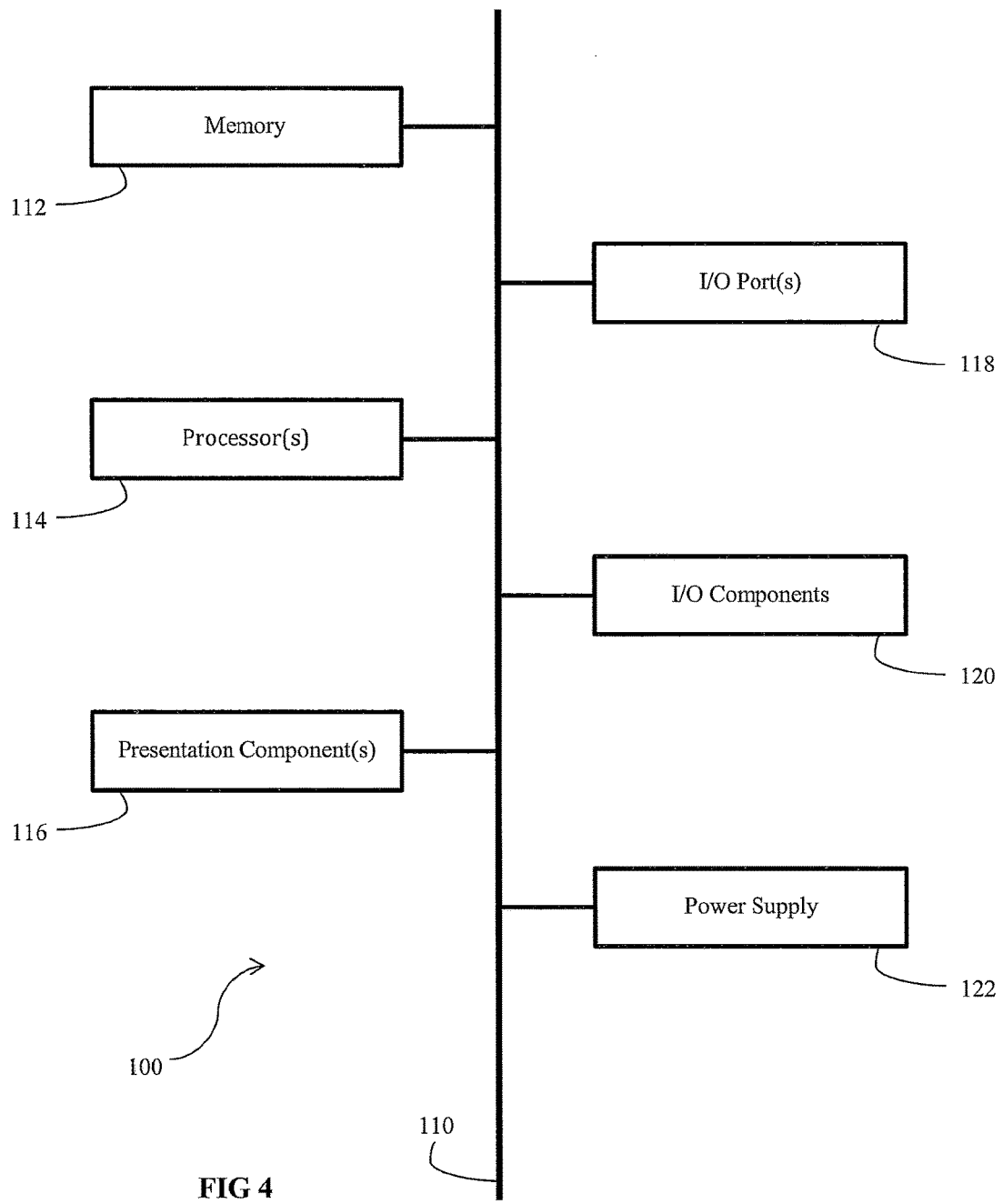
FIG. 4 is a diagram showing an exemplary operating environment suitable for implementing embodiments of the present invention.

Referring to FIG. 4, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing device 100 or environment be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, etc. Embodiments may also be practiced in distributed computing environments where tasks are performed by remote-processing devices that are linked through a communications network.

With continued reference to FIG. 4, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 3 are shown with lines for the sake of clarity, in reality, delineating various modules is not so clear, and metaphorically, the lines would more accurately be grey and fuzzy. For example, one may consider a presentation module, such as a display device, to be an I/O module. Also, processors have memory. The inventor recognizes that such is the nature of the art, and reiterates that the diagram of FIG. 3 is merely illustrative of an exemplary computing device that can be used in connection with one or more embodiments. Distinction is not made between such categories as "workstation," "server," "laptop," "handheld device," etc., as all are contemplated within the scope of FIG. 4 and references to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices; or any other tangible medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 presents data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

I claim:

1. A method for managing access to transaction documents only after access and agreement to governing documents in business transactions, comprising:

Providing a transaction document database for storing electronic transaction documents;

Receiving authentication requests from users to access said transaction document database for retrieving electronic transaction documents from said transaction document database;

Authenticating users to control access to said transaction document database;

Defining two or more user categories and assigning identifiers for each user category;

Associating an authenticated user with a user category identifier;

Storing two or more governing documents in said governing document database;

Associating said governing documents with said user category identifiers;

A user interface to present for viewing by said authenticated user at least one governing document associated with that user's user category identifier prior to said authenticated user's access to said transaction document database;

A user interface to receive a user's agreement to one or more governing documents; and Providing access to said transaction document database to an authenticated user only after said user's agreement to at least one governing document associated with said user's user category.

2. The method of claim 1, further comprising the step of authorizing users to post documents to said transaction document database for storing electronic transaction documents.

3. The method of claim 1, where three or more governing documents are stored in said governing document database and each is associated with at least one of two or more user categories.

4. One or more non-transitory computer-readable media having computer-executable instructions embodied thereon for performing a method of managing governing documents, the method comprising:

Providing a transaction document database for storing electronic transaction documents;

Receiving authentication requests from users to access said transaction document database for retrieving electronic transaction documents from said transaction document database;

Authenticating users to control access to said transaction document database;

Defining two or more user categories and assigning identifiers for each user category;

Associating an authenticated user with a user category identifier;

Storing two or more governing documents in a governing document database;

Associating said governing documents with said user category identifiers;

A user interface to present for viewing by said authenticated user at least one governing document associated with that user's user category identifier prior to said authenticated user's access to said transaction document database;

A user interface to receive a user's agreement to one or more governing documents; and Providing access to said transaction document database to an authenticated user only after said user's agreement to at least one governing document associated with said user's user category.

5. The non-transitory computer-readable media for performing the method of claim 4, with said method further comprising the step of authorizing users to post documents to said transaction document database for storing electronic transaction documents.

6. The non-transitory computer-readable media for performing the method in claim 4, where three or more governing documents are stored in said governing document database and each is associated with at least one of two or more user categories.

* * * * *